United States Patent
Kimbrel et al.

(10) Patent No.: US 6,587,865 B1
(45) Date of Patent: Jul. 1, 2003

(54) LOCALLY MADE, GLOBALLY COORDINATED RESOURCE ALLOCATION DECISIONS BASED ON INFORMATION PROVIDED BY THE SECOND-PRICE AUCTION MODEL

(75) Inventors: Tracy Jay Kimbrel, Yorktown Heights, NY (US); Marc Alan Auslander, Millwood, NY (US); David Joel Edelsohn, White Plains, NY (US); Hubertus Franke, Cortlandt Manor, NY (US); Orran Yaakov Krieger, Brookline, MA (US); Bryan Savoye Rosenburg, Cortlandt Manor, NY (US); Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/157,479

(22) Filed: Sep. 21, 1998

(51) Int. Cl.[7] .................................................. G06F 9/00
(52) U.S. Cl. ........................ 709/104; 709/100; 709/103; 711/141; 711/145
(58) Field of Search ................................ 709/101, 102, 709/103, 104, 105, 107, 100; 710/244, 242, 240; 713/502; 711/141, 145

(56) References Cited

U.S. PATENT DOCUMENTS

| | | | | |
|---|---|---|---|---|
| 4,481,583 A | * | 11/1984 | Mueller | 710/244 |
| 4,964,040 A | * | 10/1990 | Wilcox | 710/3 |
| 5,287,508 A | * | 2/1994 | Hejna, Jr. et al. | 709/102 |

* cited by examiner

*Primary Examiner*—Majid A Banankhah
(74) *Attorney, Agent, or Firm*—Douglas W. Cameron; Anne Vachon Dougherty

(57) ABSTRACT

In a computer system, a method and apparatus for scheduling activities' access to a resource with minimal involvement of the kernel of the operating system. More specifically, a "next bid" is maintained, and this parameter identifies the highest bid for the resource by any activity not currently accessing the resource. The accessing activity then compares its bid, which can be time varying, with the "next bid" to determine whether it should release the resource to another activity. The "next bid" can be accessed without any system calls to the operating system. This allows the activity to determine whether to relinquish control to the system without the necessity of communication between the two. Likewise, the operating system can access the bid of the accessing activity without explicit communication. This allows the system to determine whether to preempt the accessing activity without the necessity of communication between the two.

19 Claims, 6 Drawing Sheets

LOCALLY MADE, GLOBALLY COORDINATED RESOURCE ALLOCATION DECISIONS BASED ON INFORMATION PROVIDED BY THE SECOND-PRICE AUCTION MODEL

TECHNICAL FIELD

This invention relates to a method and apparatus for scheduling access to resources by activities.

DESCRIPTION OF THE PRIOR ART

There have been many scheduling mechanisms proposed that are based on an economic paradigm [3, 4]. Some of these incorporate the idea of using an auction to determine the next activity to be granted access to a resource. However, these proposals have dealt only with the high-level problem of allocating access to resources, and not with the low-level details of how those allocation decisions are carried out. In particular, these scheduling mechanisms have not been coupled with an efficient mechanism, i.e., one that does not incur significant overheads due to frequent communication and transfer of control between the activities contending for the resource and the arbitrator of the resource, for maintaining the relationships between activities' bids and for determining which activity is the highest bidder.

Many of the previous mechanisms that have tried to incorporate an economic model have been concerned with distributed systems in which the high cost of communication dwarf any over head involved in scheduling unlike in parallel, tightly coupled systems, where scheduling overhead can be relatively more important [5,6,7].

Processor scheduling is a central and well-studied problem in computer system design. Today, multithreaded applications are common. A thread is an independently schedulable sequence of operations. A process is a collection of one or more threads of control executing within a single address space. Threads provide an abstraction that allows a programmer to express parallelism that can be exploited to enhance application performance. Most current operating systems support multithreaded applications in such a fashion that the operating system treats each thread as a separately scheduled entity. When threads are supported in this fashion, it is simple to enforce global scheduling policies to ensure that when a single thread blocks on some request to the operating system (e.g. a system call or page fault), the rest of the application is unaffected. Treating each thread as a separately scheduled activity will also allow different threads of the same process to have different priorities. Unfortunately, such threads are inefficient because they require frequent transfer of control between the application and operating system, and because they require that the operating system maintain a state for each thread.

User-level thread schedulers manage the threads of a particular process in a fashion that is local to the process; that is, the operating system is not involved in most scheduling decisions and maintains no per-thread state. This has the advantage of greatly reducing the overhead of supporting multiple threads. However, most user-level thread packages provide no interaction between the threads and thread scheduler and the operating system. As a result, any communication with the operating system (e.g., a system call or page-fault) blocks the entire process, even though there may be threads in the process that could make use of the processor while one thread blocks on a system call. Also, since the operating system is unaware of the user-level threads, from the operating system perspective all threads within a process have the same priority, and it is not possible to manage priorities across different applications.

Two user-level thread scheduling mechanisms that do provide operating system interaction, and in which a thread that blocks in the kernel does not block the entire process containing the thread, are that of the Psyche operating system [1] and the Scheduler Activations mechanism [2]. Psyche employs shared memory for communication between the kernel and user-level processes, but this memory is not used in Psyche to coordinate the scheduling of threads belonging to different user level processes. Psyche allows a user-level process to yield a processor when it has no more ready threads. Psyche arbitrates priorities among user-level processes, but Psyche cannot arbitrate priorities among the threads of different processes.

As does Psyche, Scheduler Activations arbitrate priorities within a user-level process. The mechanism allows threads to migrate between processors in a multiprocessor system to ensure the execution of the highest priority threads of a user-level process spanning multiple processors. The authors comment parenthetically that their system is capable of arbitrating between threads with associated globally meaningful priorities, but do not discuss a mechanism for achieving this.

What is needed in a user-level thread scheduling system is a model and mechanism that enable a user-level scheduler to make an efficient local scheduling decision that is globally the correct decision, that is, the same decision would be made if there was access to all priority information.

SUMMARY OF THE INVENTION

An exclusive resource such as a computer's central processing unit is a resource that can be used by only one activity at a time. In a system with multiple concurrent activities, access to an exclusive resource must be arbitrated between activities that require access to the resource. This invention applies to systems in which activities place potentially time-varying numeric values (these values, whether time varying or constant, shall be referred to as bids) on the importance of accessing the resource, and in which at any given time, some policy is used to arbitrate between the competing bids to assign access to the resource. In addition, this invention applies to systems in which activities are to be charged for access to the resource, where the amount an activity is charged depends on both the importance it places on accessing the resource, and on the demand on that resource by other activities. These charges do not necessarily correspond to any real monetary value (although they may); in general, they are a means of enforcing a policy for allocation of rights to access the resource.

This invention is a mechanism by which activities (possibly including a designated scheduler activity) are able to cooperate to make scheduling decisions while exchanging a minimal amount of information in an efficient manner. Most decisions made by an activity are based only on local information, that is, information available to the activity without having to initiate communication with any other activity. The key piece of information, the "next-bid", identifies the highest bid for a resource by any activity other than the activity currently using the resource. The latter activity, the one using the resource, will also be referred to as the "currently active activity." When the need for the resource changes, the next-bid is used by a currently active activity to determine whether it should release the resource to another activity. Also, in a system that charges activities for their resource usage, the activity that accesses the resource is charged according to the next bid (as in a second-price auction) for each unit of time that it accesses the resource; that is, the value of the time used is assessed according to the bid of the activity waiting for the resource. The next bid is posted in memory available to the activity using the resource, the facility charging for the resource, and the entity scheduling the resource, allowing this information to be accessed without incurring any communication costs.

When an activity's valuation of the resource changes, the activity compares its new bid to the next bid. This can be done locally, without incurring the overhead of communicating with any other activity or scheduler. As long as the bid of the activity that has current access to the resource is at least as great as the next bid, no rescheduling action is needed. The currently scheduled activity continues to use the resource, and in a system that charges activities for their resource usage, is charged as described. For example, in a computer system, where high priority processes are assigned higher numbers, then each of the processes is charged based on the priority of the second highest bid multiplied by the time the process has had access to the resource. Only when the activity's bid falls below the next bid does the activity need to relinquish the resource. Unless it does so, it will be charged according to the next bid in a system that employs a charging scheme, which may limit its ability to access the resource at a later time, when its need to access the resource truly is greater than of any other activity. Similarly, when an activity that is not currently accessing the resource changes its bid (or its bid is changed on its behalf by some other entity), the new bid can be compared to the bid that is posted by the currently scheduled activity (currently active). Only when the new bid exceeds that of the activity accessing the resource does that activity need to be preempted.

OBJECTS OF THE INVENTION

It is an object of this invention to provide the ability for resource managers to make decisions that are globally correct based on local information, thus not requiring consultation with a global server, and hence avoiding communication overhead.

It is a more specific object of this invention to provide an efficient mechanism for mutually trusting and untrusting activities to determine the globally most important activity to execute.

It is another object of this invention to provide an improved accounting mechanism so that resource usage by activities can be monitored and limited if necessary.

It is another object of this invention to provide an efficient mechanism (activities access local only information) to arbitrate priorities across multiple user-level processes containing threads of mixed priorities.

It is another object of this invention to provide an efficient dispatch mechanism for economic-based schedulers in which activities' rights are represented by an artificial currency.

Thus this invention uses the auction model not just for an interesting theoretical property it provides, but in addition and primarily to be able to make local decisions while correctly enforcing a global policy.

DESCRIPTION OF THE PREFERRED EMBODIMENT

Though our invention is not limited to the following described implementation, this implementation demonstrates the potential advantages of using our mechanism over other mechanisms. The preferred embodiment of this invention is illustrated in FIGS. 1–6. The context of this preferred embodiment is that of processor scheduling for user-level thread schedulers. However, this invention could also be applied to the scheduling of resources other than processors such as I/O, memory, network bandwidth, etc. Throughout the embodiment the highest, second-highest, and maximum bids are referred to. The patent and ensuing techniques work just as well for the lowest, second-lowest, and minimum, or other equivalent. The goal of the bids is to determine the activity that should have access to the resource as well as the next-in-line activity.

Figure 1:
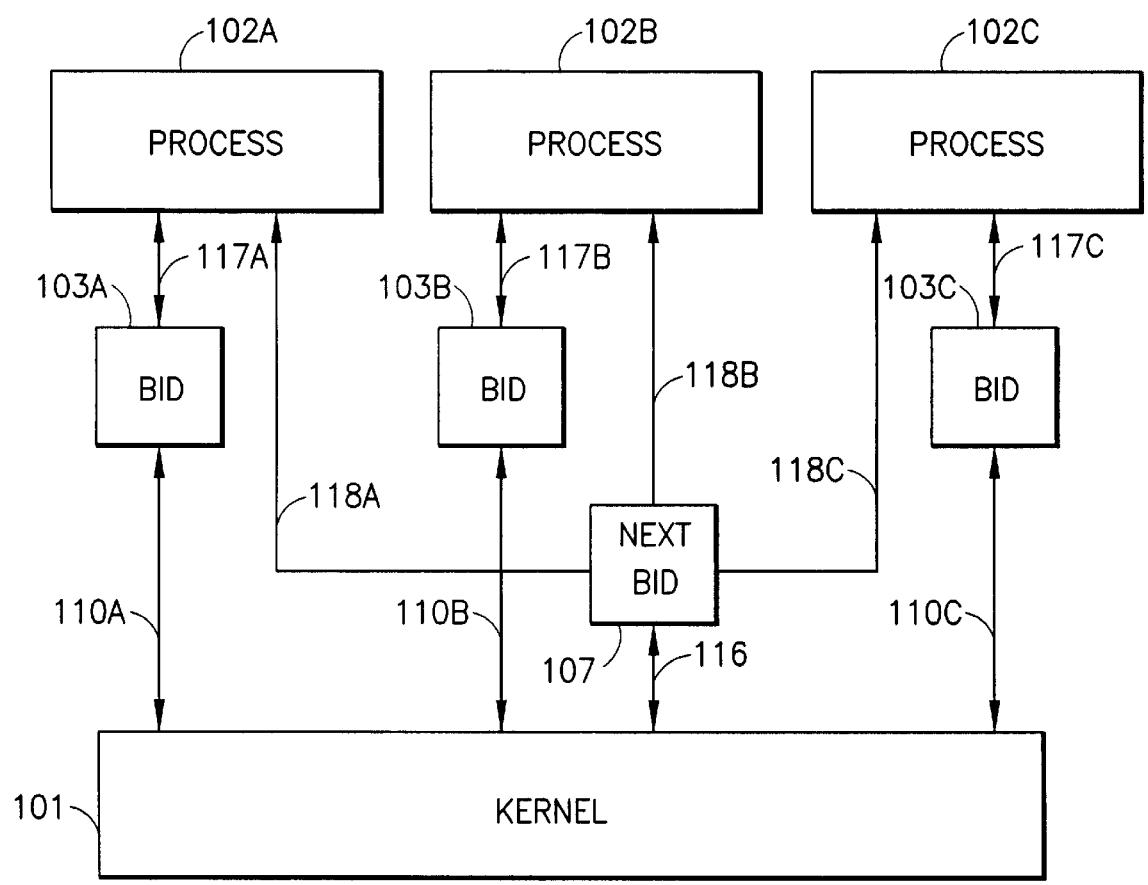
FIG. 1 shows a multiprocess system using the shared next bid in accordance with this invention.

FIG. 1 shows an operating system kernel 10, several user-level processes 102A–C, and their associated memory locations 103A–C, respectively. The memory location represented by 107 is shared by all of the processes, though our invention is not limited to this particular implementation. It is only necessary that there is a location shared by the kernel and the currently running process, and it is not necessary that this location be accessible to other processes. Directions of data flow are indicated by arrows 110A–C, 116, 117A–C, 118A–C. The arrows in FIGS. 1 and 2 indicate the directions in which information flows. More specifically, processes 102A, 102B, and 102C read and write to the shared memory location (103A, 103B and 103C respectively for each process) via arrows 117A, 117B, and 117C respectively. Likewise the kernel also reads and writes the bid via arrows 110A, 110B, and 110C. The kernel can read and write the next bid (box 107) via arrow 116, and the processes, 102A, 102B, and 102C can only read the next bid via arrows 118A, 118B, and 118C respectively. Threads, 210A, 210B and 210C can inform the user-level scheduler (209) of their priorities via arrows 211A, 211B, and 211C respectively. In this example there are three user-level processes, though our invention is not limited to any particular number of processes. Each user-level process contains one or more independent threads of control. Each thread has an associated time-varying priority value, though our invention is not limited to priority-based scheduling policies. The user-level processes and the kernel cooperate to determine which thread should be given access to a resource, e.g., the computer's central processing unit (CPU), though our invention is not limited to systems in which a central kernel provides a scheduler to enforce the scheduling policy. The scheduling policy specifies that at any time, the thread with the greatest priority value should execute, regardless of which process the thread belongs to.

Figure 2:
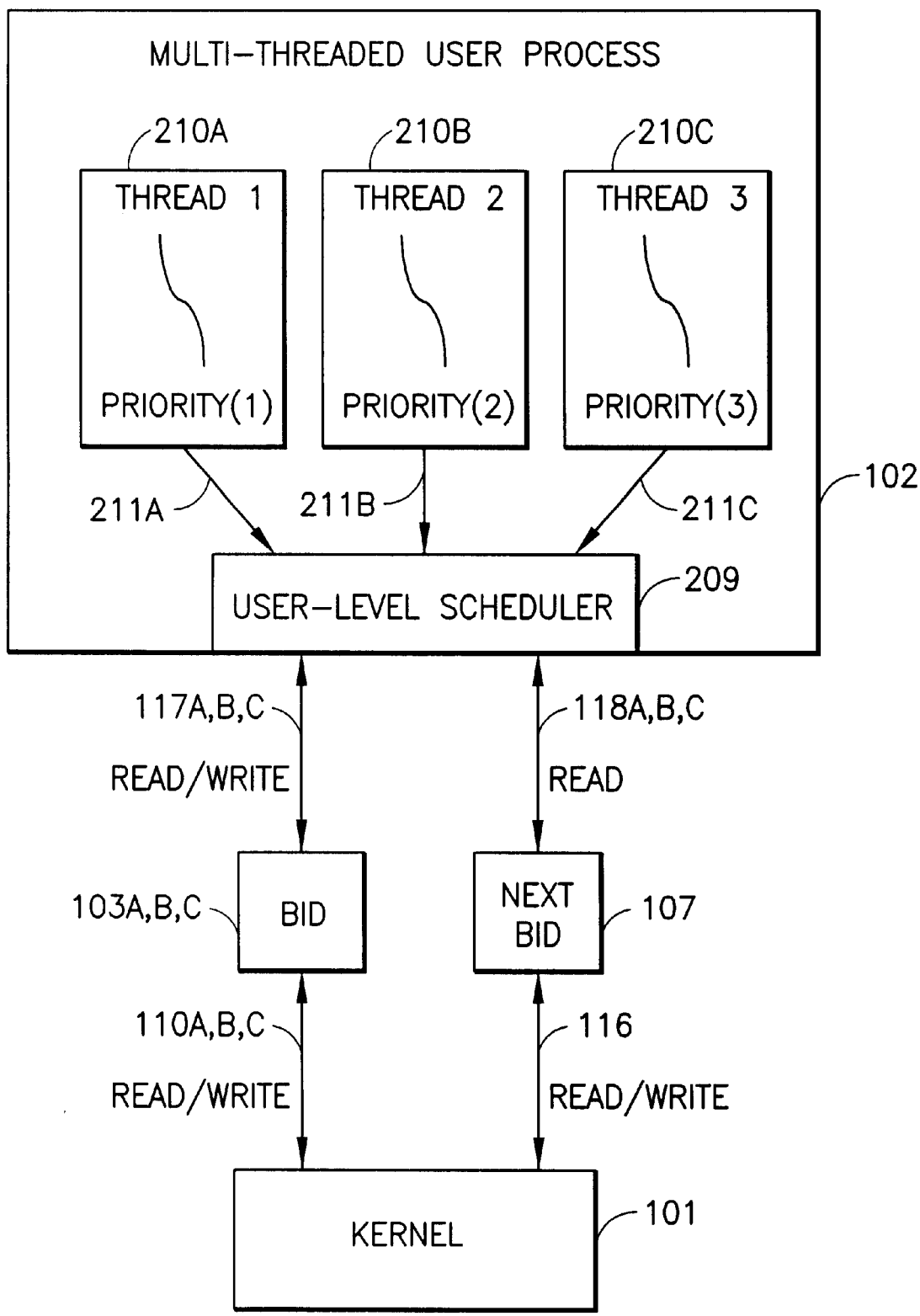
FIG. 2 shows a process of FIG. 1 in more detail.

FIG. 2 shows these elements in more detail for an operating system kernel 10 and just one user-level process 102, and the memory locations 103 and 107 shared by them. The directions of data flow are described above. Within the user-level process 102 is a user-level thread scheduler 209.

The user-level scheduler is responsible for choosing one of its threads to run and is charged at the rate of the second-highest bid. In this example there are three threads 210, 211, and 212, though our invention is not limited to any particular number of threads overall or per process. The user-level thread scheduler 209 (or the kernel 10 acting on its behalf) records the priority of the selected thread in the bid memory location 103. (Note: in this embodiment we use the term priority for determining the ordering of activities. In reality this could be any scheme that allows an ordering of activities. For instance, currency or tokens may be distributed to activities and then used in differing quantities based on the degree to which an activity needs a resource. This is just one example; any other scheme that allows an ordering on activities to be achieved may be used.) The bid memory location 103 is writable both by the user process 102 and by the kernel. This is because the kernel may update the bid of the user process on its behalf For instance, on completion of an input/output (I/O) operation, an interrupt handler in the kernel may respond to the event, and raise the priority of a process since the availability of the data changes the thread's status from "blocked on I/O" to "ready." The next bid location 107, which is readable by the user process and readable and writable by the kernel, contains the second-highest priority among those posted by all user processes. If there are two or more bids that are identical and higher than all other bids, then one of these bids is treated as the second highest bid for the purpose of this algorithm.

Figure 3:
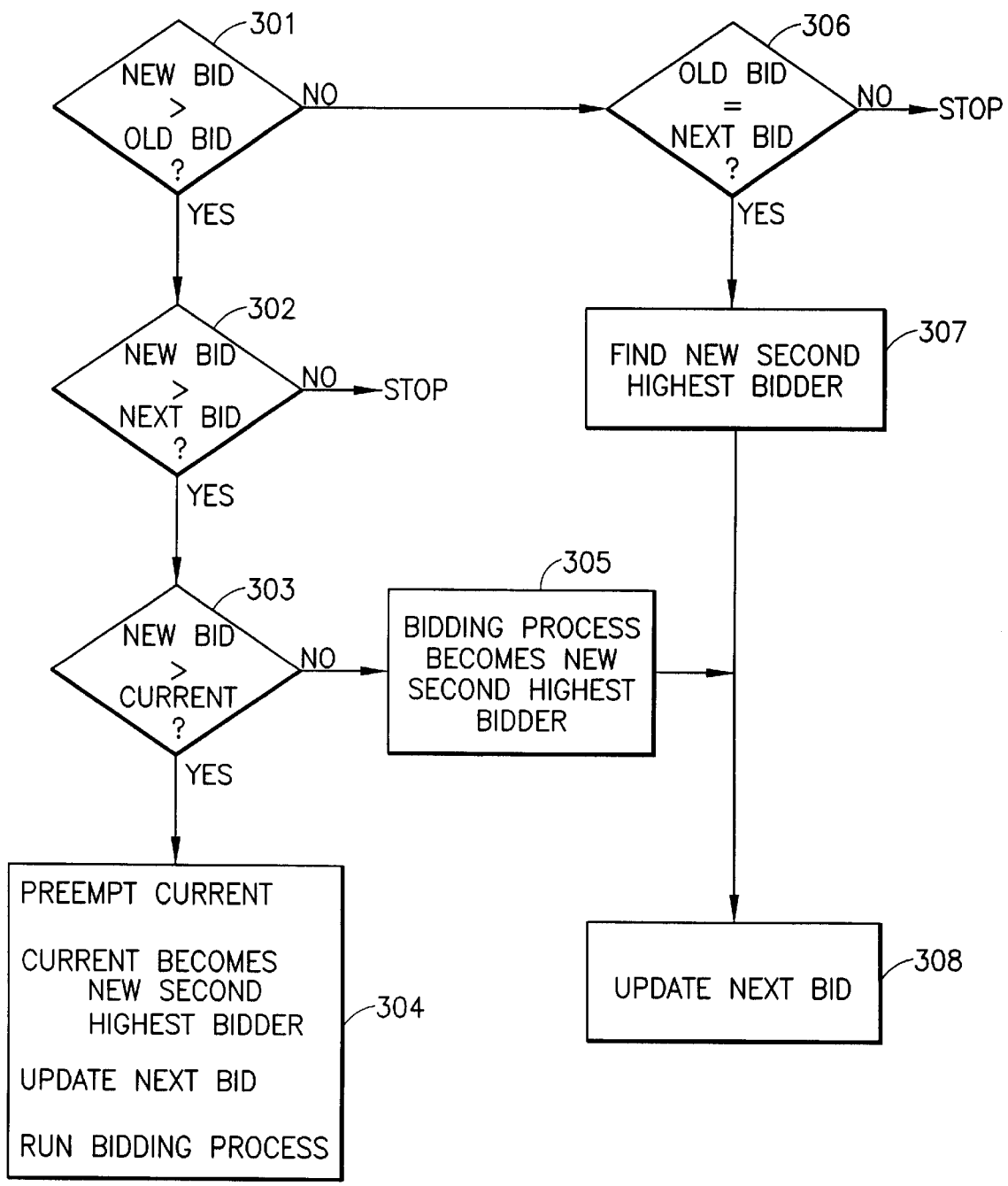
FIG. 3 is a flow chart used to show how to change the next bid for the ready and waiting processes.

FIG. 3 shows the flowchart used upon a change in the bid of a process that is not currently executing. In the figure, "new bid" refers to the new value of the bid of the process which is changing its bid, and "old bid" refers to that process' former bid. "Next bid" refers to the second-highest bid maintained by the kernel. "Current" refers to the process that is currently executing. The new bid is compared to the old bid (step 301). If the new bid is greater than the old bid, it is possible that the process changing its bid becomes the highest bidder or the second-highest bidder. The new bid is thus compared to the next bid to determine whether this is the case (step 302). If the new bid is greater than the next bid, then the new bid is compared to the bid of the current process (step 303). If the new bid is greater than that of the current process, the process changing its bid will be granted access to the resource, and the next bid location is updated to contain the bid of the preempted process (step 304). Otherwise, the new bid is now the second-highest bid, and the next bid location is updated to reflect this (steps 305 and 308). If the new bid is not greater than the old bid, then it is possible that the old bid was previously the second-highest bid, and that the next bid location must be updated to reflect the current situation. Step 306 checks for this condition. If the answer to step 306 is yes, the second-highest bid among all processes must be determined (step 307) and stored in the next bid location (step 308). Now the second-highest bidder must be determined from the set of bidders. An appropriate method should be chosen from the literature based on the number of processes that will be represented. While the patent is not limited the below methods for this determination they illustrate how one might implement this determination. For example, for a small number of processes, this could be accomplished by scanning though a linked list; and for a large number of processes, the priorities could be stored in a data structure known in the literature as a priority queue. A priority queue is a data structure that allows the greatest value to be determined and removed, and new values to be stored, in time logarithmic in the number of values stored. (This use of the term "priority" in "priority queue" is distinct from that of process or thread priorities; the use of a priority queue to store thread priorities is incidental.)

Those skilled in the art will appreciate that in the case that the new bid does not cause a change in the current allocation of the resource, little computation is required on the part of the process changing its bid, and more importantly, that no communication or transfer of control between processes is necessary. In the case that the new bid does cause a change in the current allocation of the resource, communication between processes is unavoidable, since the currently running process must relinquish the resource to the new highest bidder.

Figure 4:
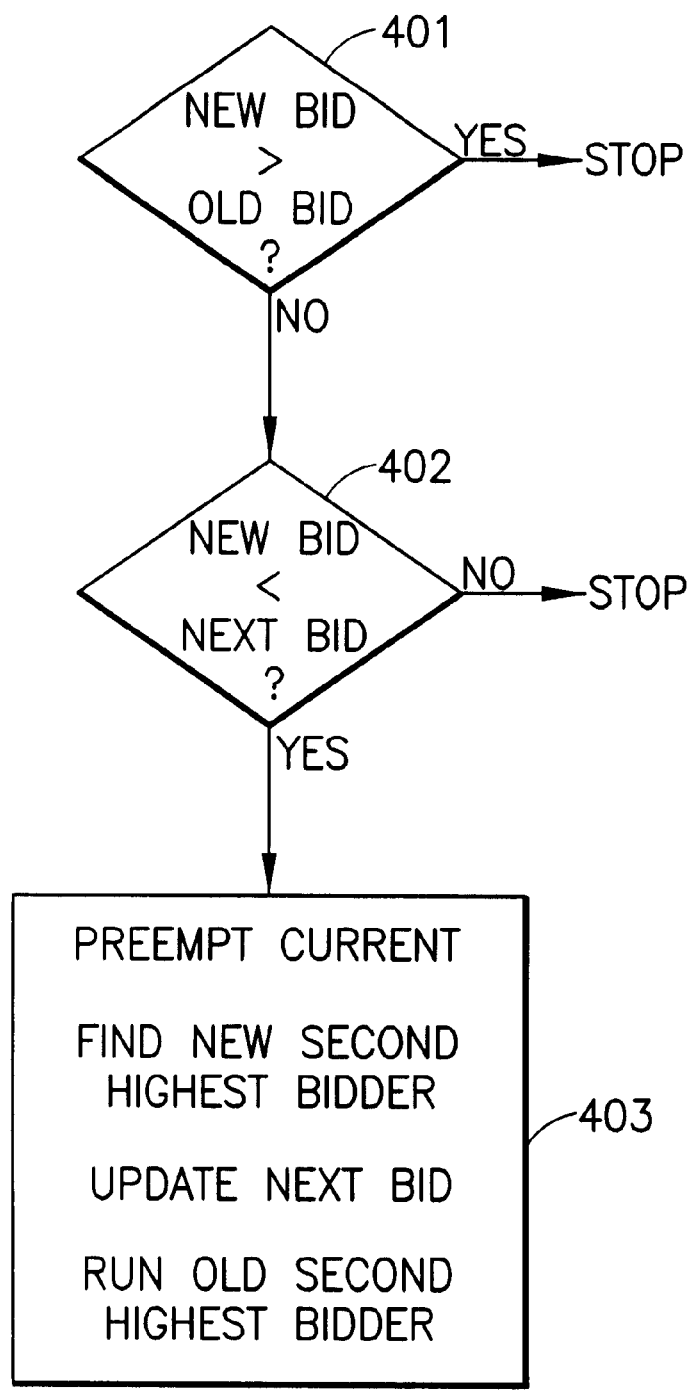
FIG. 4 is a flow chart used to show how to change the bid of a running process.

FIG. 4 shows the flowchart used upon a change in the bid of the process that is currently executing. Again, "new bid" refers to the new value of the bid of the process which is changing its bid, and "old bid" refers to that process' former bid. The new bid is compared to the old bid (step 401). If the new bid is greater than the old bid, the process will still be the highest bidder, and the second-highest bid will not change, so no action is necessary. Otherwise, it is possible that the process is no longer the highest bidder. The new bid is compared to the second-highest bid (step 402). If the new bid is lower than the second-highest bid, the current process should relinquish the resource (step 403). The former second-highest bidder is granted access, and the second-highest bid among all processes (which may be that of the process that reduced its bid and relinquished the resource) must be determined and stored in the next bid location. As before, the second-highest bid is found by scanning a list or by accessing a priority queue.

Again, those skilled in the art will appreciate that in the case that the new bid does not cause a change in the current allocation of the resource, little computation is required on the part of the process changing its bid, and more importantly, that no communication or transfer of control between processes is necessary. In the case that the new bid does cause a change in the current allocation of the resource, communication between processes is unavoidable, since the currently running process must relinquish the resource to the new highest bidder.

Figure 5:
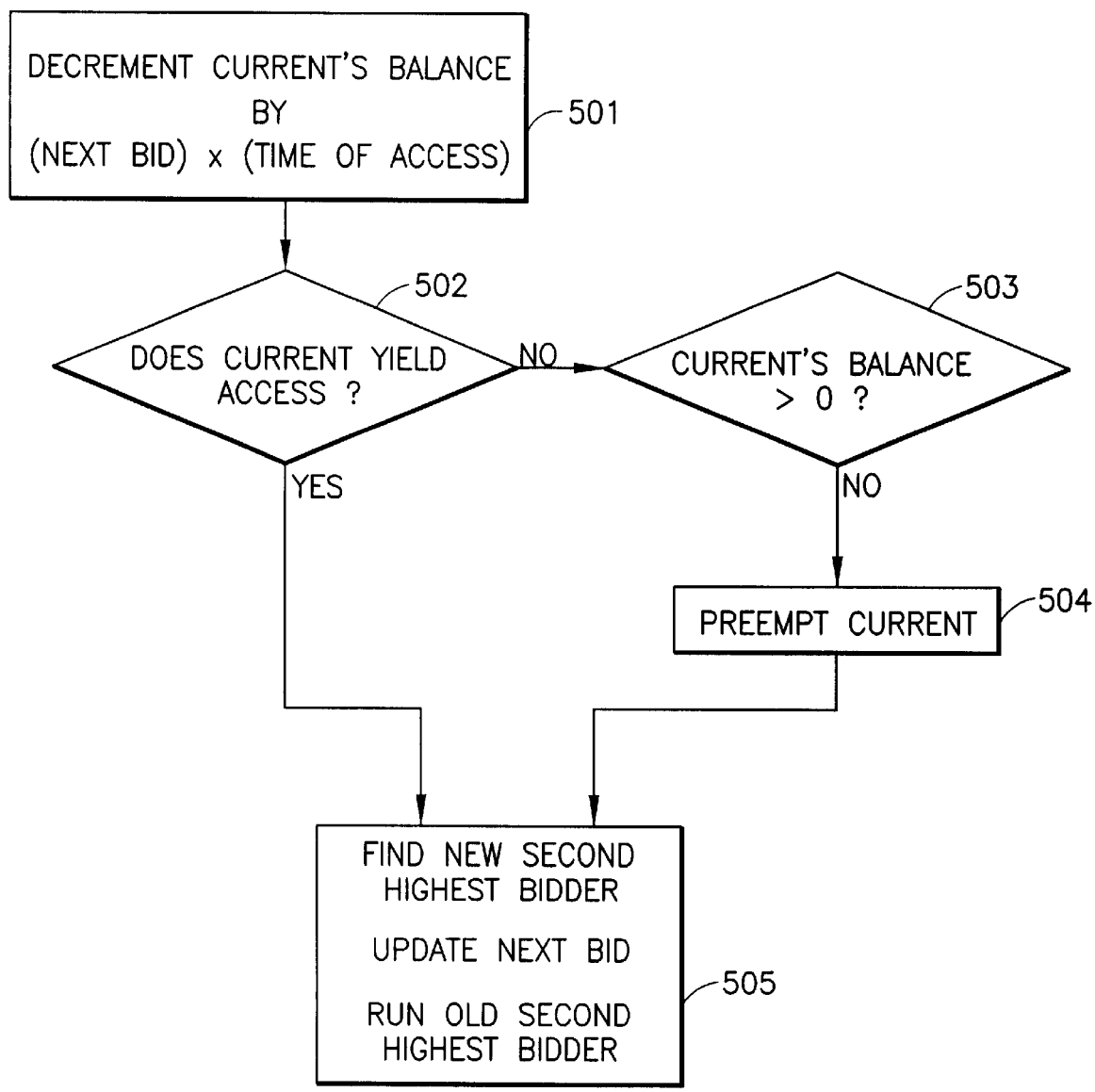
FIG. 5 is a flow chart used to charge the current process and preempt it if its access privilege is exhausted at a given priority level.

FIG. 5 shows the actions taken by the kernel to monitor resource usage in a system that charges activities for their resource usage. The kernel uses this flowchart when the activity currently accessing the resource yields it, as well as at periodic intervals in order to ensure that activities are not using the resource more than allowed by their privileges. The kernel decrements the current activity's balance of currency according to its resource consumption (step 501). The resource consumption of that activity is the integral of the next bid over the time from the last periodic interval to the present. Next, the kernel takes one of two paths depending on whether the current activity has yielded the resource or the kernel is performing one of its periodic checks (step 502). If the latter, the kernel checks whether the activity has exhausted its allocation of currency (step 503). If it has not, the activity is allowed to continue to access the resource. Otherwise, the resource is preempted from the activity (step 504), the new high bidder and second highest bidder are determined, and the new high bidder is allowed to access the resource (step 505). If the current activity has yielded the resource, step 505 is carried out immediately after step 502.

Figure 6:
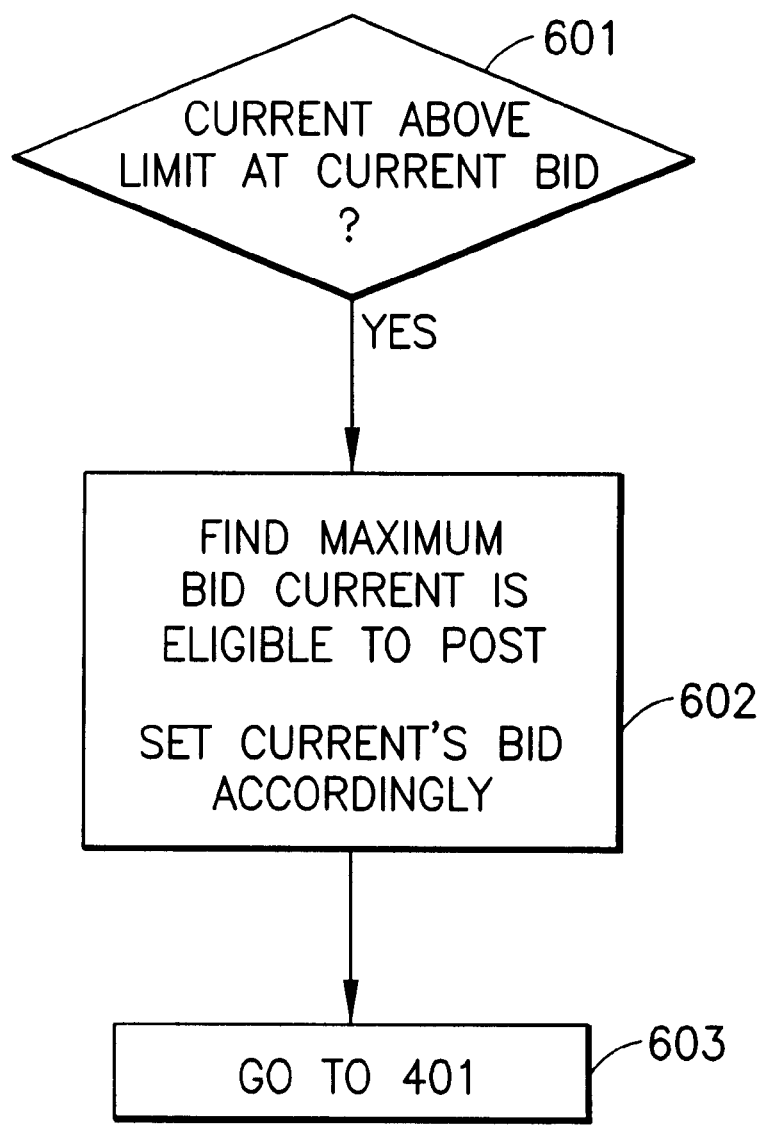
FIG. 6 is a flow chart used to show how to control frequency of access to a resource by a process.

FIG. 6 shows the actions taken by the kernel in a system that limits resource consumption based on an activity's past resource usage on a per-priority basis. The kernel determines whether the current activity has exceeded its limit of consumption at its currently claimed priority level in the current time period (step 601). If this is true, the kernel next determines the maximum priority value that the activity is eligible to claim (step 602), and assigns this value as the current activity's new bid. The kernel then determines the activity that should be allowed to access the activity next upon a change in the current activity's bid as in the procedure illustrated in FIG. 4.

This invention does not preclude the use of additional policies to enforce limits on resource usage. This example illustrates one method by which our invention might be used to charge user-level processes for their resource usage and to cooperate with additional policies to enforce limits on resource usage. Consider a system with two priority levels, "high" and "low," though our invention is not limited to any particular number of priority levels. Suppose that the resource allocation policy specifies that each process is allowed up to two units of high priority service out of every ten units of time; these values are meant as an example only. Suppose a process A reaches this limit by scheduling one of its threads for two consecutive units of time while there is at least one other process with a ready thread with a bid of value "high." After it receives its two units of high-priority service, process A should not be allowed to schedule its threads claiming a bid of "high" until eight time units elapse. The kernel scheduler will preempt the CPU from process A after it receives its allotted two units of service, and will grant access to one of the waiting processes which have posted bids of "high." The kernel scheduler will record the fact that A has used its two units of high priority service and must wait eight time units before accessing the resource again with a bid of "high." Even if A posts a bid of "high," the kernel scheduler will grant the CPU to user-level processes as though A's bid were "low" for eight time units, until A is eligible to receive high-priority service again. The kernel can use a standard timer interrupt mechanism to wake itself up periodically and detect situations such as this example.

All of the above preferred embodiment describes the arbitration of one resource on a single processor. However, in actual computers, many resources may need to be arbitrated on multiple processors. The techniques above can be applied to each resource whether that resource is CPU time, memory, I/O, network bandwidth, etc., and the techniques can be applied per processor on each of the processors in the system. As used in this application, a computer system is any system that uses computers to schedule use of its resources.

REFERENCES

1. B. D. Marsh, M. L. Scott, T. J. LeBlanc and E. P. Markatos, "Proceedings of the 13th ACM Symposium on Operating System Principles, October 1991.
2. T. E. Anderson, B. N. Bershard, E. D. Lazowska and H. M. Levy, "AMC Transactions on Computer Systems," Vol. 10, No. 1, February 1992.
3. S. H. Clearwater, Editor, "Market-based Control: A Paradigm for Distributed Resource Allocation," World Scientific 1995.
4. B. A. Huberman, Editor, "The Ecology of Computation," North Holland, Amsterdam 1988.
5. K. Eric Drexler and Mark S. Miller, "Incentive Engineering for Computational Resource Management", The Ecology of Computation, pp. 231–266.
6. Thomas W. Malone, Richard E. Fikes, Kenneth R. Grant, and Michael T. Howard "Enterprise: A Market-like Task Scheduler for Distributed Computing Environments", The Ecology of Computation, pp. 177–205
7. Carl. A Waldspurger, Tad Hogg, Bernardo A. Huberman, Jeffrey O. Kephart, and Scott Stornetta, "Spawn: A Distributed Computational Economy", IEEE Transactions on Software Engineering 18:103–117, 1992.

What is claimed is:

1. In a computer system, a method of providing user-level scheduling access to an exclusive resource between a plurality of activities, said activities comprising program threads of said system, said method comprising:
   a. posting a bid by each of a plurality of said activities requiring access to said resource;
   b. comparing said bids to determine which first of said activities is to be granted access resource;
   c. granting access to said first activity to said resource;
   d. maintaining a shared scheduling state which comprises a second bid of a second of said activities which currently does not have access to said resource;
   e. comparing said bid in said shared scheduling state with said first bid of said first activity which currently has access to said resource; and
   f. granting access to a second activity if said first bid compares with said second bid in said shared scheduling state in a predetermined manner.

2. A method as recited in claim 1, wherein said shared scheduling state is in a same memory address location for all said activities requiring access to said resource.

3. A method as recited in claim 1, wherein one activity is designated as the scheduler and is responsible for arbitrating access to said resource.

4. A method as recited in claim 3, wherein said activity is a central processing unit scheduler.

5. A method as recited in claim 1, wherein said resource is a central processing unit.

6. A method as recited in claim 1, wherein said resource comprises a selected one of a central processing unit, a sensor, an actuator, a network, memory, and an input/output device.

7. A method as recited in claim 1, wherein said first bid changes its value with each unit of time of access of said first activity and in accordance with said second bid in said shared scheduling date.

8. A method as recited in claim 1, wherein each bid is a priority value.

9. A method as recited in claim 8, further comprising limiting the frequency with which each of said activities is permitted to access said resource while associated with a corresponding priority value.

10. A method as recited in claim 8, wherein each activity contains one or more independent threads of control, and wherein each thread has an associated a priority value, wherein said bid posted by each activity is a priority value associated with one of said threads so that access to said resource at any time is granted to one of said threads with a greatest said priority value when said each activity is granted access to said resource.

11. A method as recited in claim 10, wherein limits are placed on a frequency with which said threads are allowed to access said resource while associated with said priority values.

12. A method as recited in claim 1, wherein each bid is a priority value, wherein each activity is a process, and wherein said priority value is determined by a selected one of the following: a priority of a process, an amount of currency a process is willing to spend for access to said resource, and tokens allocated by a process.

13. A method as recited in claim 1, wherein each bid is a priority value and wherein said bids in said shared bid state are compared to determine which first of said activities has the greatest priority value, and wherein access to said resource is granted to said first activity with said greatest priority value.

14. In a computer system having at least one resource and a plurality of activities, comprising threads of programs requiring access to said resource, a user-level method of determining when to relinquish a current activity's access to said resource, said method comprising:
   a. maintaining a second bid which is indicative of a currently inactive activity's priority for access to said resource;
   b. maintaining a first bid which is indicative of said current activity's priority for continued access to said resource;
   c. comparing said first bid with said second bid; and
   d. discontinuing said current activity's access to said resource if said second bid compares with said first bid in a predetermined manner.

15. In a computer system having a plurality of activities competing for access to a plurality of resources, said activities comprising threads of programs, a method of providing user-level scheduling access to each of said resources, for each resource said method comprising:
   a. comparing priority values of each of said activity's requirement for access to said resource;
   b. granting access to a first activity, of said activities, having a first priority value which compares with other of said priority values in a first predetermined manner; and
   c. while said first activity has access to said resource, comparing said first priority value with said other priority values, wherein said first activity will relinquish access to said resource if said first priority value compares with said other priority values in a first predetermined manner.

16. In a computer system having a plurality of activities competing for access to a plurality of resources, said activities comprising threads of programs, a method of providing user-level scheduling access to at least one of said resources, said method comprising:
   a. posting a priority value for each of said activities requiring access to said resource;
   b. granting access to one of said activities having posted a first priority value which compares with other of said priority values in a predetermined manner;
   c. for those of said activities not currently having access to said resource and requiring access to said resource, posting a second priority value;
   d. comparing said second priority value with said first priority value; and
   e. relinquishing said one activity's access to said resource if said first priority value compares with said second priority value in a predetermined manner.

17. A program storage device readable by a machine, tangibly embodying a program of instructions executable by the machine to perform user-level method steps for determining when to relinquish a current activity's access to a resource in a computer system having at least one resource and a plurality of activities comprising threads of programs requiring access to said resource, said method comprising:
   a. maintaining a second bid which is indicative of a currently inactive activity's priority for access to said resource;
   b. maintaining a first bid which is indicative of said current activity's priority for continued access to said resource;
   c. comparing said first bid with said second bid; and
   d. discontinuing said current activity's access to said resource if said second bid compares with said first bid in a predetermined manner.

18. In a computer system, a method of providing user-level scheduling access to an exclusive source between a plurality of activities, said activities comprising threads of programs, of said system, said method comprising:
   a. comparing bids of each of a plurality of said activities requiring access to said resource to determine which first of said activities is to be granted access to said resource;
   b. granting access to said resource to said first activity; and
   c. relinquishing access to said resource by said first activity if a predetermined result is obtained by comparing said bid of said first activity with bids of said activities which currently do not have access to said resource to determine whether said first activity should relinquish access to said resource.

19. A program storage device readable by a machine, tangibly embodying a program of instructions executable by said machine to perform method steps, in a computer system having a plurality of activities comprising threads of programs competing for access to a plurality of resources, for providing user-level scheduling access to each of a plurality of resources, for each resource said method comprising:
   b. comparing priority values of each of said activity's requirement for access to said resource;
   b. granting access to a first activity, of said activities, having a first priority value which compares with other of said priority values in a first predetermined manner; and
   c. while said first activity has access to said resource, comparing said first priority value with said other priority values, wherein said first activity will relinquish access to said resource if said first priority value compares with said other priority values in a first predetermined manner.

* * * * *